US011780486B2

United States Patent
Ogishima

(10) Patent No.: US 11,780,486 B2
(45) Date of Patent: Oct. 10, 2023

(54) STACKABLE CARTS WITH ELECTRONIC APPARATUS AND SPACER FOR STACKABLE CARTS

(71) Applicant: TOSHIBA TEC KABUSHIKI KAISHA, Tokyo (JP)

(72) Inventor: Takuya Ogishima, Izu Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/830,900

(22) Filed: Jun. 2, 2022

(65) Prior Publication Data
US 2023/0070487 A1    Mar. 9, 2023

(30) Foreign Application Priority Data
Sep. 3, 2021  (JP) .................. 2021-143933

(51) Int. Cl.
| | |
|---|---|
| *B62B 3/18* | (2006.01) |
| *H02J 50/00* | (2016.01) |
| *B62B 5/06* | (2006.01) |
| *B62B 3/14* | (2006.01) |
| *H02J 7/00* | (2006.01) |

(52) U.S. Cl.
CPC .............. *B62B 3/18* (2013.01); *B62B 3/1416* (2013.01); *B62B 5/06* (2013.01); *H02J 7/0063* (2013.01); *H02J 50/00* (2016.02)

(58) Field of Classification Search
CPC .......... B62B 3/1404; B62B 3/18; B62B 3/14; B62B 5/00; B62B 5/0009; B62B 3/186; B62B 3/188; B62B 3/184; B62B 5/0006
See application file for complete search history.

(56) References Cited

U.S. PATENT DOCUMENTS

| | | | | |
|---|---|---|---|---|
| 3,015,494 | A  * | 1/1962  | Fosbrook, Sr. ....... | B62B 3/1404 |
| | | | | 280/47.15 |
| 9,840,265 | B1 * | 12/2017 | Thuma .................... | B62B 3/186 |
| 11,299,188 | B2 * | 4/2022 | Yokoyama ............ | B62B 3/1424 |
| 2004/0084863 | A1 * | 5/2004 | Ryan ..................... | B62B 3/1404 |
| | | | | 280/33.991 |
| 2019/0270469 | A1 | 9/2019 | Yokoyama et al. | |
| 2021/0001911 | A1 * | 1/2021 | Kogoshi ............... | H02J 50/005 |

FOREIGN PATENT DOCUMENTS

| | | | | |
|---|---|---|---|---|
| AU | 2012244385 | A1 * | 6/2013 | ............. B62B 3/186 |
| DE | 3615290 | A1 * | 12/1986 | |
| DE | 4038740 | A1 * | 6/1991 | |
| GB | 1156349 | A  * | 6/1969 | |

* cited by examiner

*Primary Examiner* — James A Shriver, II
*Assistant Examiner* — Michael T. Walsh
(74) *Attorney, Agent, or Firm* — Kim & Stewart LLP

(57) ABSTRACT

A cart has a wheeled base unit with a first frame portion on one side and a second frame portion on another. The frame portions are coupled by a frontend part. A handle unit connects the frame portions at a backside of the cart and also connects the base unit to a basket. An inner frame portion is between the frame portions and extends to the frontend part of the base unit. The inner frame portion includes a front contact portion and a stopper portion. A spacer portion is attached to the inner frame portion closer to the backside of the base unit than the stopper portion. The spacer portion is positioned to contact a front contact portion of another cart when carts are nested. A coupling portion is sandwiched between the inner frame portion and a frontend part of another cart when carts are nested.

18 Claims, 6 Drawing Sheets

STACKABLE CARTS WITH ELECTRONIC APPARATUS AND SPACER FOR STACKABLE CARTS

CROSS-REFERENCE TO RELATED APPLICATION

This application is based upon and claims the benefit of priority from Japanese Patent Application No. 2021-143933, filed Sep. 3, 2021, the entire contents of which are incorporated herein by reference.

FIELD

Embodiments described herein relate to a nesting or stacking carts, such as shopping carts, and a spacer for such carts.

BACKGROUND

In retail stores such as supermarkets and shopping malls, shopping carts are used by customers for carrying merchandise (hereinafter, the shopping cart may be simply referred to as a "cart").

Typically, such carts have a so-called stacking structure by which multiple carts can be nested together front-to-back to save space when not in use by customers.

In some more recent shopping cart designs, sales data processing apparatuses permitting customer registration and/or checkout of merchandise have been incorporated. Such a data processing apparatus provided on the cart may be realized as a tablet terminal, a smartphone, or other electronic apparatus.

To avoid breaking or damaging the electronic apparatus in collisions between nested carts, a regulating portion for maintaining a fixed minimum distance between stacked carts can be provided so that nested carts do not overlap so much as to permit the electronic apparatuses to hit each other or other portions of the nested carts.

However, when the minimum distance between carts is increased by the positioning of a regulating portion or the like, the coupling between the stacked carts becomes weaker, and it is thus harder to move nested carts as a group and inconvenience may be caused in some instances as nested carts unintentionally separate from one another during movement.

DETAILED DESCRIPTION

Certain embodiments concern shopping carts for which the distance between carts when stacked is regulated to avoid breakage and failure of an electronic apparatus mounted on the carts while still maintaining the stacked state stacked carts are moved as a collective unit.

According to one embodiment, a cart includes a base unit with a wheel position at each of four corners. The base unit includes a first frame portion and a second frame portion. The first frame portion connects a pair of wheel positions on a first side of the base unit. The second frame portion connects a pair of wheel positions on a second side opposite the first side. The first and second frame portions are coupled to each other by a frontend part. A basket unit is above the base unit. A handle unit connects the first frame portion to the second frame portion at a backside of the base unit and also connects the base unit to the basket unit. An inner frame portion is between the first and second frame portions and extends to the frontend part of the base unit. The inner frame portion includes a front contact portion and a stopper portion that is at a position closer to the backside of the base unit than the front contact portion. A spacer portion is attached to the inner frame portion at a position closer to the backside of the base unit than the stopper portion. A back end of the spacer portion is positioned to contact a front contact portion of another cart when carts are nested together front-to-back. A coupling portion is on the spacer portion and extends towards the backside of the base unit. The coupling portion is positioned to be sandwiched between the inner frame portion and a frontend part of another cart when carts are nested together front-to-back.

Certain example embodiments will be explained using the drawings. Note that the embodiments described are non-limiting examples of carts, wagons, trolleys, or the like that may adopt the disclosed aspects.

Figure 1:
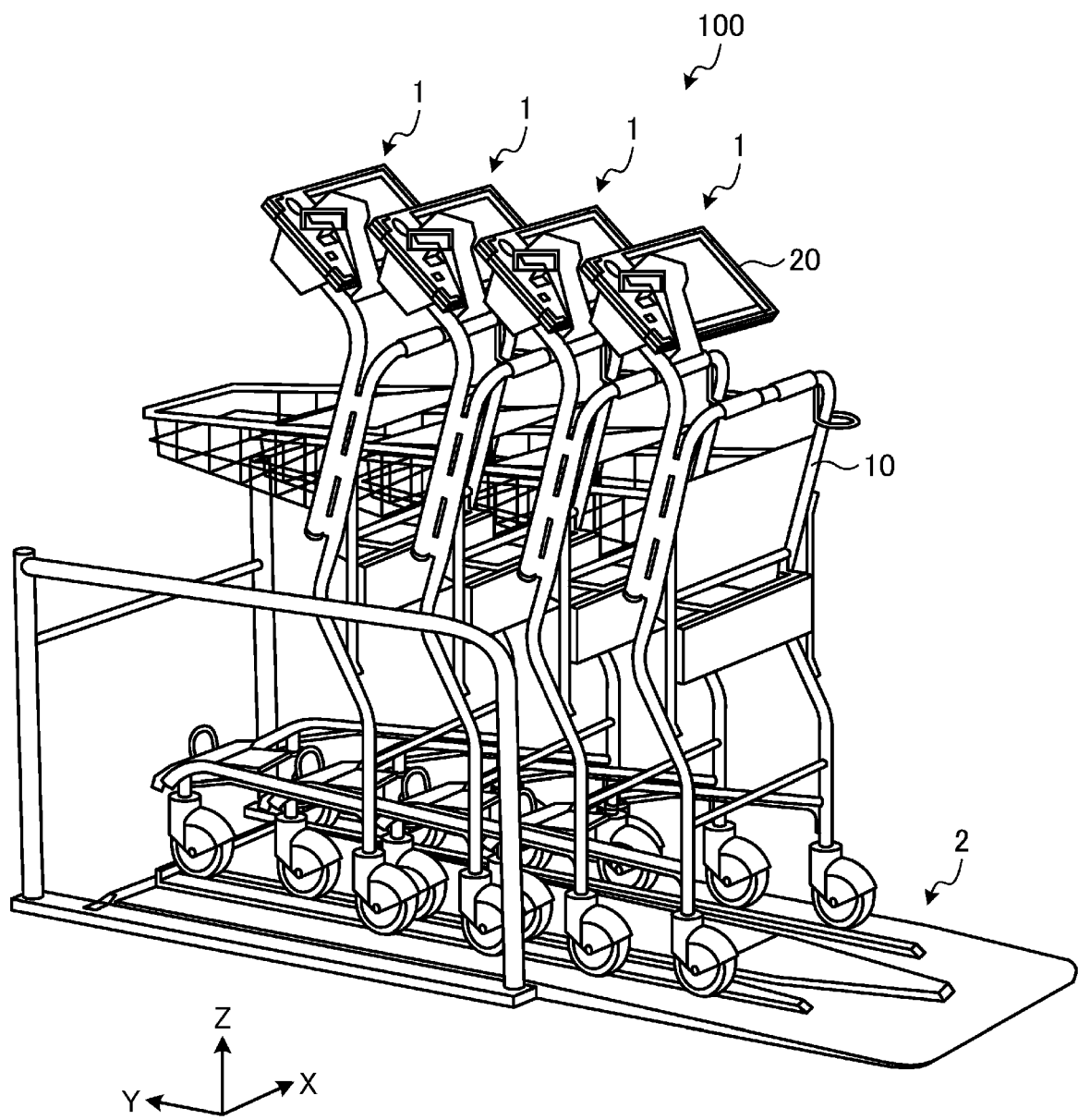
FIG. 1 is a perspective view showing an example of stacked carts according to an embodiment.

FIG. 1 is a perspective view showing a plurality of carts 1 which are stacked or nested with each other. Each cart 1 has an electronic apparatus 20 mounted thereon. FIG. 1 shows a case where a contactless power supply device 2 is provided in a cart area where the carts 1 are stored in a retail store when not in use by a customer or the like. The contactless power supply device 2 transmits power wirelessly without requiring contact or connections to the cart 1 with a cable, a terminal, or the like. The carts 1 are stacked to overlap with one another in a front-back direction on the contactless power supply device 2. Overlapped carts 1 nested with one another in the front-back direction may be referred to as a "stack".

Here, a three-dimensional coordinate system for aid in the understanding and description of the relevant structures is shown in FIG. 1. Width direction of the carts 1 and the contactless power supply device 2 are the X-axis direction. The movement direction (or stacking direction) of the carts 1 with respect movement into and out of the contactless power supply device 2 is the Y-axis direction. The height dimension of the carts 1 is Z-axis direction. In the description, movement of the cart 1 along the Y-axis direction into the contactless power supply device 2 is referred to as a forward movement and the direction out of the contactless power supply device 2 is referred to as a backward movement. The positive direction along the Y-axis can be called a forward movement direction of the cart 1 and the negative direction along the Y-axis can be called a backward movement direction of the cart 1.

Figure 2:
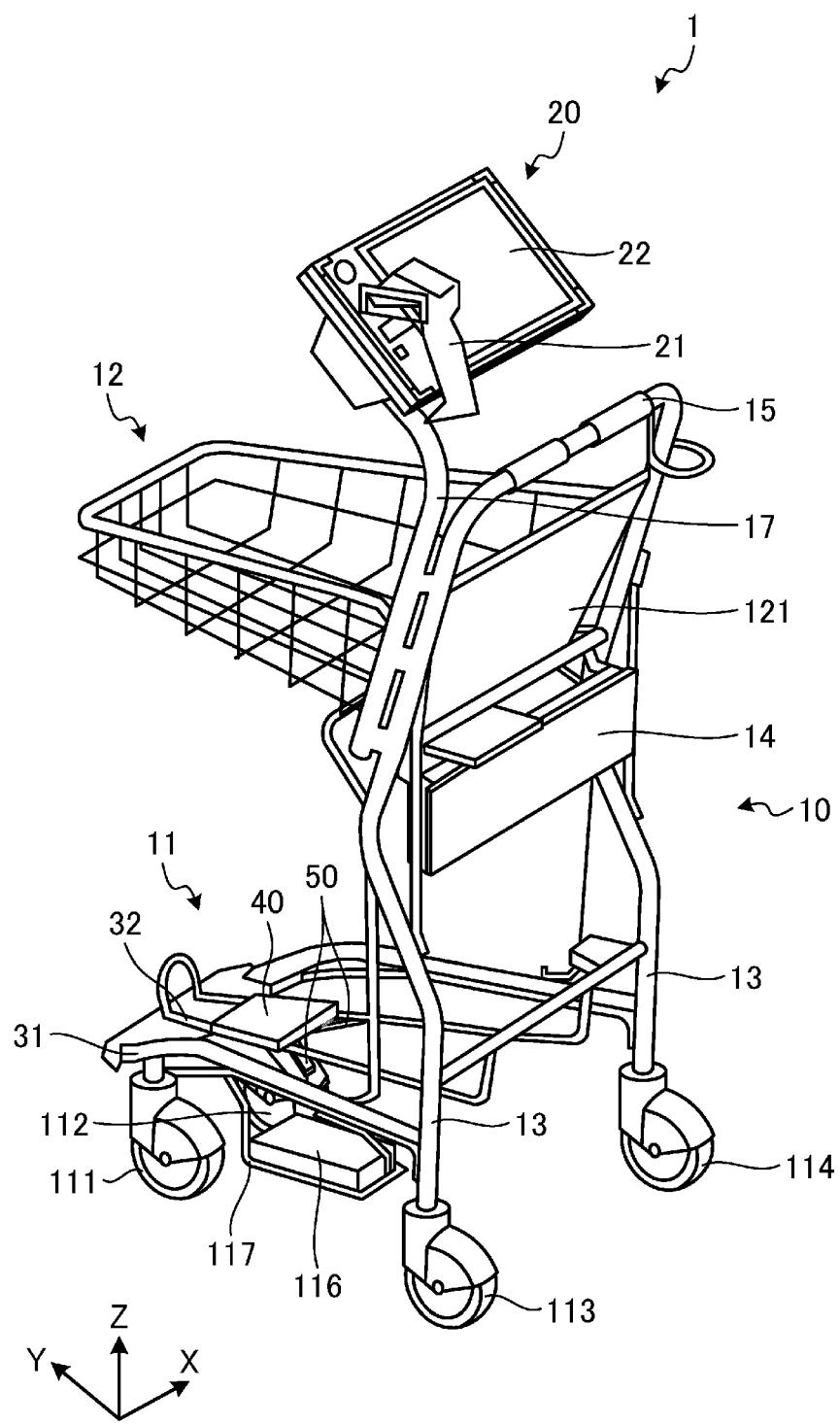
FIG. 2 is a perspective view of a cart with electronic apparatus.

FIG. 2 is a perspective view showing an example of an appearance and a configuration of the cart 1. The cart 1 includes a cart body 10 and an electronic apparatus 20 on the cart body 10. In this example, the electronic apparatus 20 is a merchandise registration device and will thus be referred to as merchandise registration device 20. The cart body 10 can be moved by the manual pushing of an operator. The cart 1 can be used by a customer in a retail store for carrying merchandise to be purchased.

The cart body 10 includes a base unit 11, a holding unit 12, vertical frames 13, a handle portion 15, and a support 17. Such components are similar to those of a conventional cart lacking a merchandise registration device 20. The cart body 10 includes a holder 14 housing a secondary cell (rechargeable battery) for supplying power to the merchandise registration device 20. The handle 15 is located on the backside of the cart body 10.

The base unit 11 includes wheels (a pair of front wheels 111, 112 and a pair of rear wheels 113, 114) and an attachment portion 117 to which a power receiving portion 116 for receiving power from a contactless power supply 2 is attached. The power receiving portion 116 receives power transmitted from the contactless power supply device 2 and transmits the power to the secondary cell. The secondary cell is charged by the received power. The merchandise registration device 20 operates with power from the secondary cell. The distance between the front wheel 111 and the front wheel 112 is smaller than the distance between the rear wheels 113, 114. The attachment portion 117 places the power receiving portion 116 in a lower portion of the base unit 11 substantially horizontally.

The holding unit 12 is a basket-shaped container provided above the base unit 11 and holds packages (e.g., merchandise to be purchased by a customer) or the like. The holding unit 12 of this example is configured so a face 121 at the backside flips up when pushed forward from the backside. Thereby, a subsequent cart 1 for a stack can be inserted into the preceding holding unit 12 of an already stacked cart by pushing the face 121 of the preceding cart body 10 with a frontend part of the holding unit 12. The holding unit 12 has a width that gets gradually narrower and a bottom surface that gradually angles upward from the backside toward the front side. Thereby, as shown in FIG. 1, when the carts 1 are stacked to overlap in the front-back direction, the preceding and subsequent holding units 12 of different carts 1 are nested.

The vertical frames 13 connect the base unit 11 and the holding unit 12 and support the holding unit 12 positioned above the base unit 11.

Note that the cart body 10 itself does not necessarily have to itself incorporate the basket-shaped container, but may have instead, in other examples, a basket receiving portion for a detachable merchandise basket to be mounted thereon, and, in such cases, the basket receiving portion and the detachable merchandise basket may be considered together to form a holding unit 12.

The holder 14 is located under the holding unit 12 and houses the secondary cell. The secondary cell is a battery charged by the power received by the power receiving portion 116.

The handle portion 15 can be gripped by a customer for moving the cart body 10 and is provided on the upper part of the vertical frames 13.

The support 17 in this example is attached to one of the vertical frames 13 and supports the merchandise registration device 20 so as to be positioned above the height of the handle portion 15.

The merchandise registration device 20 allows a customer to register items for purchase. The merchandise registration device 20 in this example includes a scanner 21 and a display unit 22. The scanner 21 reads merchandise information from the merchandise to be sold. The scanner 21 reads, for example, a merchandise code such as a barcode or the like printed on or affixed to an item. The display unit 22 is a touch panel display or the like. For example, the display unit 22 displays information corresponding to the item(s) of merchandise registered or read by the scanner 21. The display unit 22 can display a graphical user interface screen and receive user input operations according to the displayed information. The merchandise registration device 20 operates on electrical power from the secondary cell (housed in the holder 14).

Figure 3:
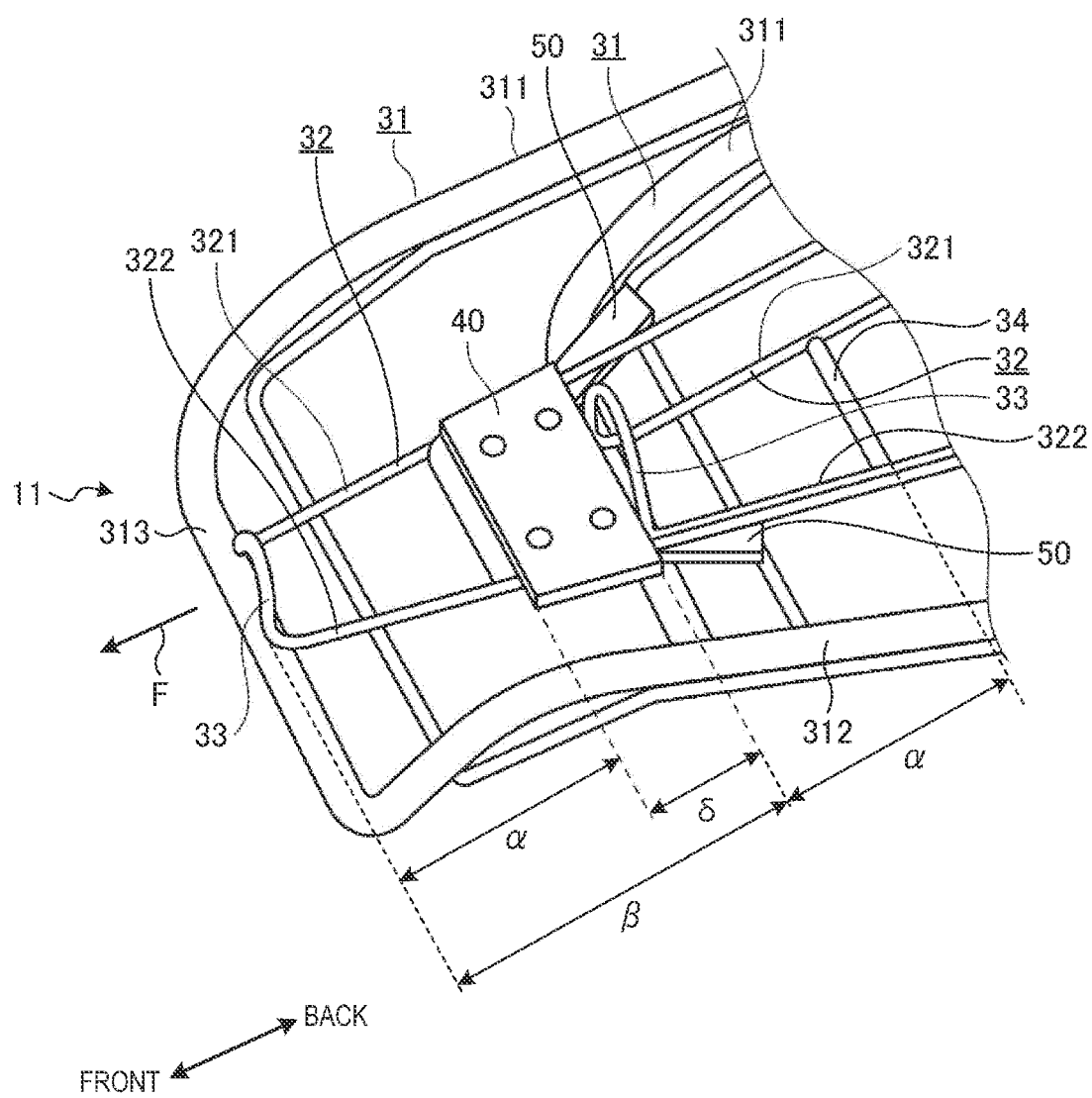
FIG. 3 is a perspective view of a base unit of a cart.

FIG. 3 is a perspective view showing an example of an appearance of a portion of a base unit 11. The base unit 11 includes an outer frame portion 31, an inner frame portion 32, a contact portion 33, and a stopper 34. The dimension α is the distance between the contact portion 33 and the stopper 34 in the front-to-back direction. The arrow F depicts the direction of a force applied from one cart body 10 to another cart body 10 when carts 1 are stacked one with the other.

The outer frame portion 31 has substantially a U-shape. A pair of frames 311, 312 are coupled by a frame 313 at the frontend part of the outer frame portion 31, and the outer frame portion 31 has an open rear part. The front wheels 111, 112 and the rear wheels 113, 114 are provided at the four corners of the outer frame portion 31.

The inner frame portion 32 is provided in a position surrounded by the outer frame portion 31 and has substantially a U-shape. A pair of frames 321, 322 are coupled at the frontend part of the inner frame portion 32, and the rear part is open like the outer frame portion 31. The portion connecting the frontend parts of the frames 321, 322 is the contact portion 33. The inner frame portion 32 has substantially the same dimension in the front-back direction as the outer frame portion 31, but has the narrower width (X-axis dimension) than the outer frame portion 31. The inner frame portion 32 can be formed with dimensions for receiving, or permitting the attachment, of a merchandise basket (e.g., a hand-carriable shopping basket).

The frames 311, 312 get farther apart from each other with distance from the frontend portions, and the height (distance) from the floor surface for the frames 311, 312 increases higher from the front end toward the back end. The frames 321, 322 are similarly shaped in this regard. With such an arrangement, the frames 321, 322 of a subsequently stacked cart body 10 can be inserted between the frames 321, 322 of the already stacked cart body 10 and thus the carts 1 can be stacked in the front-back direction.

The contact portion 33 is provided at the frontend of the inner frame portion 32. The contact portion 33 holds the frontend part of any merchandise basket mounted on the inner frame portion 32 and also is positioned to press against a predetermined part of the base unit 11 of a preceding cart body 10 when carts 1 are stacked, and thus acts to regulate the minimum possible distance between stacked carts 1.

In general, the stopper 34 is the element which a contact portion 33 like component of a conventional cart (e.g., a cart without a merchandise registration device 20 mounted thereon) contacts when such carts are stacked. The position of the stopper 34 in a conventional cart is set so the distance between stacked conventional carts is appropriate. However, such a distance set with a stopper 34 and the contact portion 33 positions for conventional carts is not appropriate when carts 1 with a merchandise registration device 20 are stacked. Note that, in the case of the conventional carts in related art, the distance between the contact portions 33 of the stacked adjacent carts will be substantially the distance between the contact portion 33 and the stopper 34 (that is, dimension α).

However, the cart 1 of an embodiment further includes a regulating portion 40. The regulating portion 40 is provided between the frames 321, 322 and blocks the forward movement of the base unit 11 of the subsequent stacked cart body 10, and regulates (limits) the amount of the overlap between the stacked carts 1 so the merchandise registration devices 20 of stacked carts 1 do not bang against each other or the like. The regulating portion 40 may also be referred to as a spacer portion in some contexts.

The regulating portion 40 adds the dimension δ to the distance between the contact portions 33 of stacked carts 1. The dimension δ corresponds to the dimension of the regulating portion 40 itself along the front-to-back direction. Thereby, the distance between stacked carts 10 increases from the dimension α in related art to the dimension β. Note that the regulating portion 40 can be attached and detached in some examples.

The dimension δ of the regulating portion 40 along the front-back direction is determined in the following manner. The dimension α (distance between the contact portion 33 and the stopper 34 on a cart body 10) is the normal stacking distance for conventional carts (without the merchandise registration devices 20) in related art. Accordingly, the positioning of stopper 34 is not necessarily appropriate for a cart body 10 with a merchandise registration device 20 thereon.

The desired dimension β is selected based on the appropriate stacking (minimum separation) distance for carts 1 with merchandise registration devices 20. For example, the dimension β is set such that merchandise registration devices 20 on adjacent carts 1 will not contact or hit one another when carts 1 are stacked.

Thus, the dimension δ can be calculated as the difference between the desired dimension β and the dimension α. The regulating portion 40 is attached at the backside of the stopper 34, and thereby, the distance between the contact portions 33 of the stacked preceding and subsequent carts 10 may be increased from the dimension α to the dimension β.

The cart 1 further includes coupling portions 50. The coupling portions 50 are provided mounted to the undersides of the frames 321, 322. When the carts 1 are stacked, the coupling portions are sandwiched between the frames 321, 322 and the upper surface of the frontend part (frame 313) of the subsequent base unit 11. Thereby, the coupling portions 50 help to couple adjacent stacked carts 1 by a friction force (between frame 313 of the rearward stacked cart 1 and coupling portions 50 of the frontward stacked cart 1). Note that the coupling portions 50 of the present embodiment can be integrally provided as a component of the regulating portion 40 or may be affixed to the regulating portion 40 in some manner, such as by screws or the like. The assembled or integrally provided coupling portions 50 and regulating portion 40 collectively form an example of what may be referred to as a spacer 60.

Figure 4:
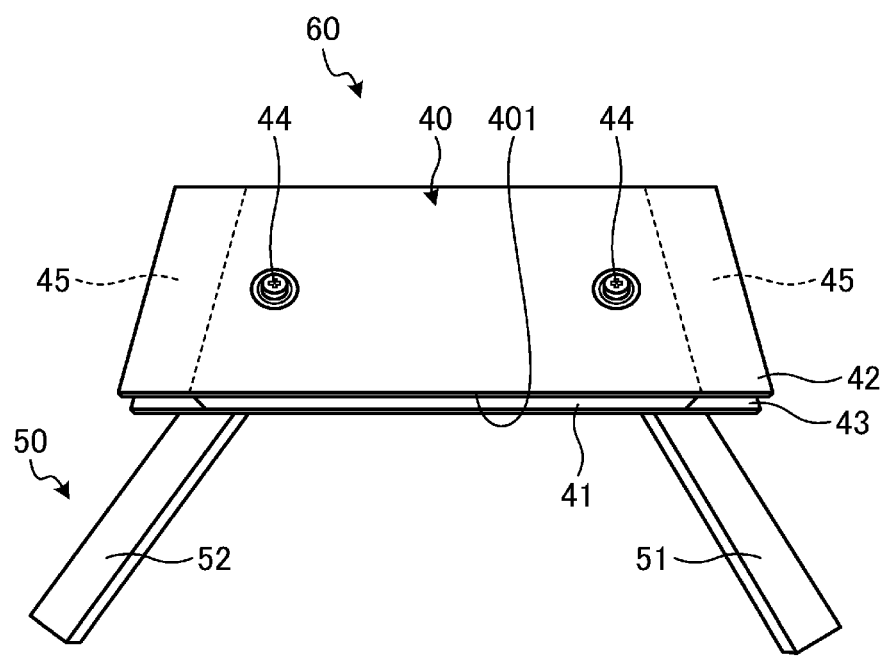
FIG. 4 is a perspective view of a spacer.
Figure 5:
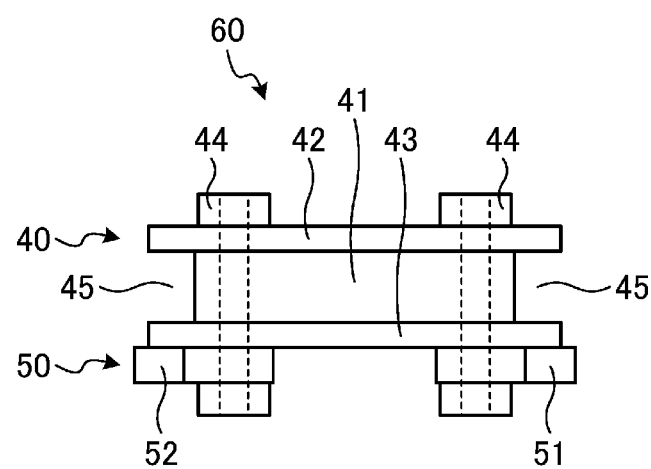
FIG. 5 is a rear view of a spacer.

Referring to FIGS. 4 and 5, the spacer 60 of one embodiment includes a regulating portion 40 (spacer portion 40) and coupling portions 50. FIG. 4 is a perspective view of the spacer 60 as seen from above and behind. FIG. 5 is a rear, end-on view showing an example of the structure of the spacer 60.

The regulating portion 40 comprises a thick plate 41, thin plates 42, 43, and screws 44. The thick plate 41 is a trapezoidal part with a width increasing from the front side toward the backside. The thick plate 41 has substantially the same thickness as the frames 321, 322 of the inner frame portion 32. The thin plates 42, 43 have trapezoidal shapes with widths increasing from the front side toward the backside. The dimensions of the thin plates 42, 43 in the front-back direction (Y-axis direction) are substantially the same as that of the thick plate 41, but the widths (dimensions in the X-axis direction) of the thin plates 42, 43 are greater than that of the thick plate 41. The thick plate 41 is sandwiched between the thin plates 42, 43 in the thickness direction (vertical direction). The screws 44 fix the thick plate 41 to the thin plates 42, 43.

The width direction dimension of the thick plate 41 is further explained. A length of the front side of the trapezoidal thick plate 41 is substantially the same as the corresponding length of the stopper 34. Further, a length of the backside of the trapezoidal thick plate 41 is substantially the same as the distance between the frame 321 and the frame 322 at a position displaced towards the backside at the dimension δ from the position of the stopper 34.

By the above arrangement, the regulating portion 40 has a groove 45 which surrounds the perimeter of the regulating portion 40. In any event, at least frames 321, 322 can be fitted in the groove 45 on either side of the regulating portion, and thereby, the regulating portion 40 can be attached to the inner frame portion 32. The attachment can be performed by inserting the regulating portion 40 from the rearward direction forward along the frame 311 and the frame 312 towards the backside of the stopper 34, and detachment can be performed by a reverse motion.

The attached regulating portion 40 now blocks the forward movement of the contact portion 33 of a subsequent stacked cart body 10 at an edge 401 at the backside and thus regulates the position of the subsequent cart body 10.

The coupling portions 50 include a pair of plate-like members 51, 52 projecting from the left and right of the back end part of the regulating portion 40. The members 51, 52 of the present embodiment attach to the lower surface of the thin plate 43 toward the backside direction, however, in other examples, the members 51, 52 may attach at upper surface of the thin plate 43 (e.g., at a position between the thick plate 41 and the thin plate 43). Note that in the present example, the coupling portions 50 are also fixed to the thick plate 41 and the thin plates 42, 43 by the screws 44.

The regulating portion 40 is attached to the inner frame portion 32, and thereby, the coupling portions 50 are positioned under the frames 321, 322.

Figure 6:
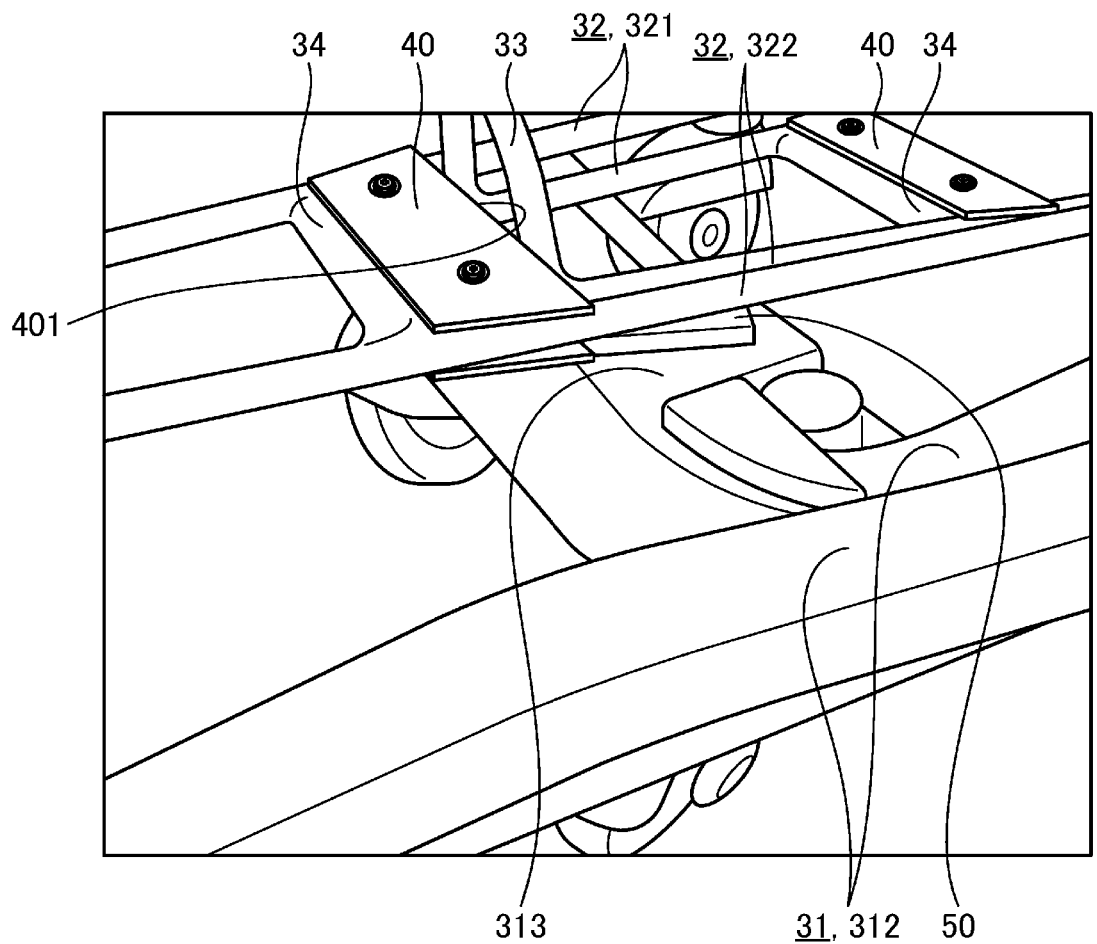
FIG. 6 is a diagram for explanation of functions of regulating portions and coupling portions of stacked carts.
Figure 7:
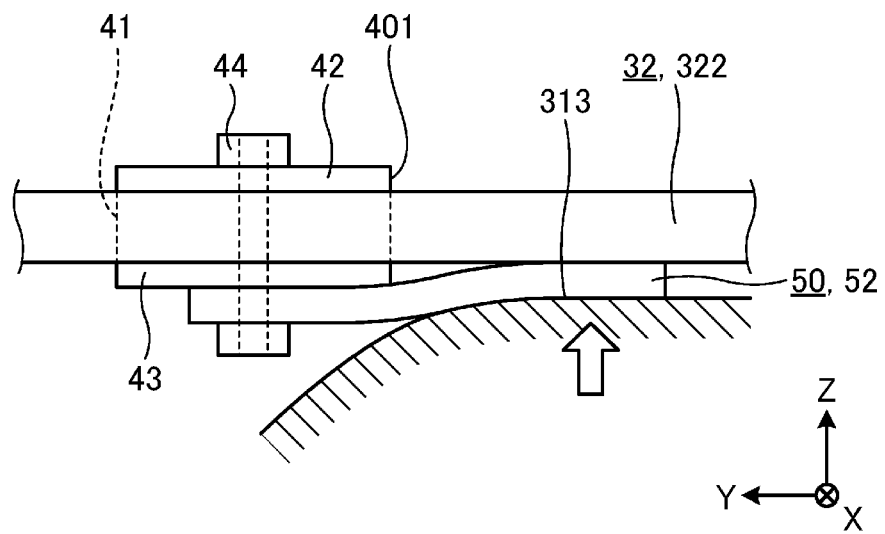
FIG. 7 is a diagram for additional explanation of the functions of regulating portions and coupling portions of stacked carts.

FIGS. 6 and 7 are diagrams for explanation of the regulating portions 40 and the coupling portions 50 in the stacked carts 1. In the cart storage area, the contact portion 33 at the frontend of one cart body 10 (back cart) abuts the edge 401 at the backside of the regulating portion 40 of another cart body 10 (front cart). Thereby, forward movement of the back cart body 10 stops when its contact portion 33 hits the edge 401 of the regulating portion 40 of the front cart body 10.

When the back cart body 10 is stopped in this manner, the coupling portions 50 of the front cart will be sandwiched between the lower surfaces of the frames 321, 322 of the front cart body 10 and the upper surface of the frame 313 of the back cart body 10. Thereby, the coupling portions 50 fill the gaps between these frames and closely contact the frames 321, 322 and the frame 313. Note that the coupling portions 50 sandwiched between both the frames 321, 322 and the frame 313 may bend (as shown in FIG. 7) or not, depending on the implementation.

In the stacked state, a friction force is generated between the coupling portions 50 on the front cart 1 and the frame 313 of the back cart 1. Thus, it will be relatively hard to move the frame 313 relative to the coupling portions 50 (e.g., to disengage the back cart 1 from the front cart 1). A force thus acts to prevent the back cart body 10 from being separated from the front cart body 10. That is, the coupling portions 50 couple the frames 321, 322 to the frame 313 by the friction force. The coupling force is generally less than that obtained by direct fastening by screws or hooks, but can be set such that stacked carts 1 can be moved together as a stacked unit without difficulties associated with unintended separation of carts during the movement.

As described above, according to the embodiment, the cart 1 may generally be handled in the same manner as a cart without an electronic apparatus. That is, by the conventional motions and efforts to place the cart 1, the preceding and subsequent carts 1 may be coupled by the friction force but with a predetermined distance between the carts 1 overlapping in the front-back direction.

As described above, according to the embodiment, the distance at stacking can be regulated to be a predetermined overlapping degree, and thereby, the overlapping degree at stacking may be set to avoid breakage and failure of the electronic apparatus 20. Further, according to the embodiment, the stacked state of carts 1 can be maintained when stacked carts 1 are moved as a stacked unit (or group) and thus the movement of stacked carts 1 may be easier than otherwise be the case without incorporation of a spacer 60 or the like.

With a spacer 60 in which the regulating portion 40 and the coupling portions 50 are integrated, the time and effort for attachment to and detachment from a cart body 10 may be reduced, and the spacer 60 may be more easily attached to and detached from the cart body 10 than for non-integrated solutions. Thereby, when retrofitting work or the like to attach a spacer 60 to a cart body 10 already operating at a store is performed, such work may be performed in a short time.

Note that, in an embodiment, the regulating portion 40 and the coupling portions 50 are integrated, however, in other examples, the coupling portions 50 and the regulating portion 40 may be separate (non-integrated). In such a case, the coupling portions 50 may be attached directly to the lower surfaces of the frames 321, 322 by an adhesive or the like.

The coupling portions 50 of an embodiment include the pair of plate-like members 51, 52, however, in other examples, the shapes of the coupling portions 50 may be different from that depicted. For example, the coupling portions 50 may not have a space between the members 51, 52 as depicted (that is, a single plate-like member serving as both the members 51, 52 may be adopted).

The above described embodiments can be modified in various aspects to change part of the configurations or functions described above. As such, a modified example will be explained below as another embodiment. In general, differences between the modification and the already described examples will be highlighted, and those aspects that are substantially similar will not be described again. Furthermore, the modified example may be individually implemented or appropriately combined with any other described embodiment to the extent feasible.

MODIFIED EXAMPLE

Figure 8:
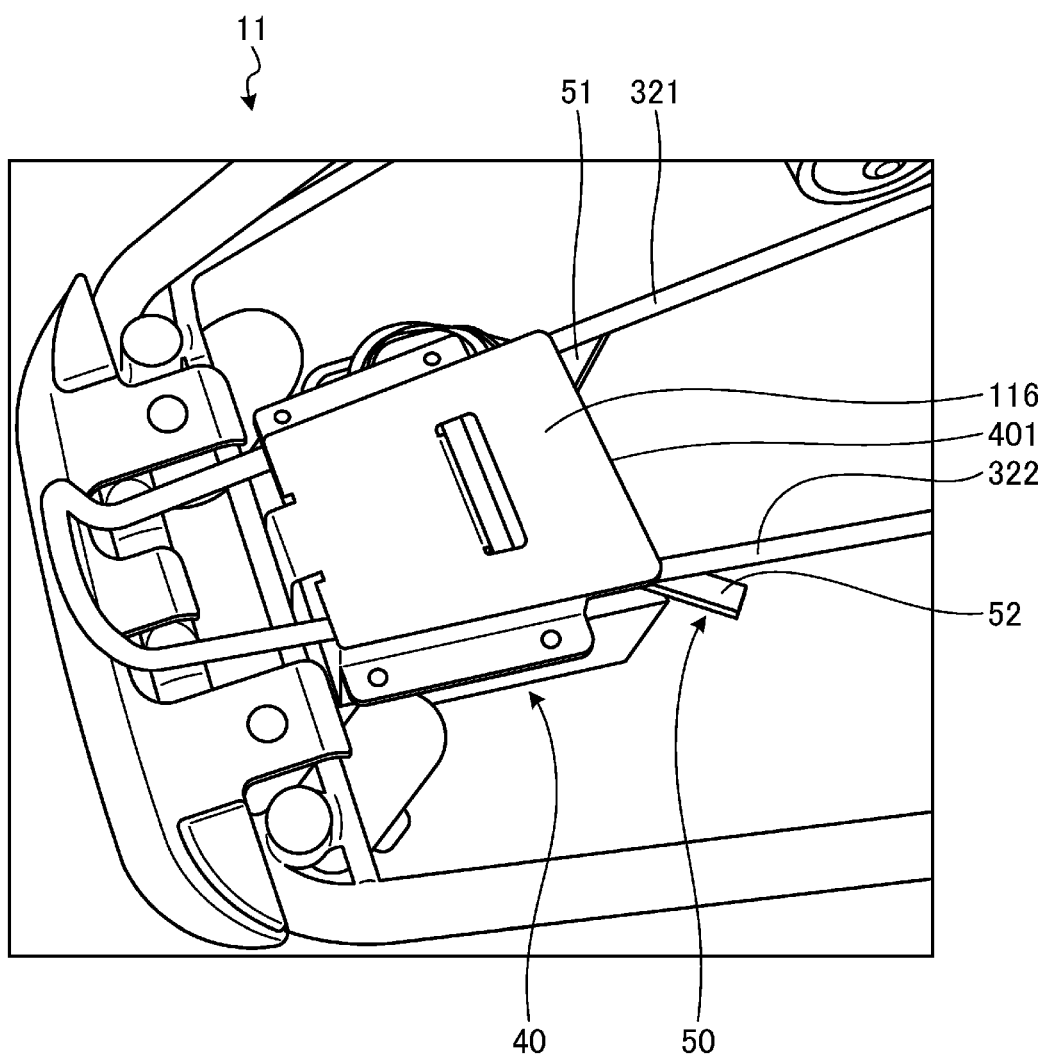
FIG. 8 is a perspective view of a power receiving portion that functions as the coupling portions and the regulating portion according to a modified example.

FIG. 8 is a perspective view showing an example of an appearance of the power receiving portion 116 that also functions as the coupling portions 50 and the regulating portion 40. In this example, the power receiving portion 116 is provided at the position of the regulating portion 40 in the above described embodiment. The coupling portions 50 are attached to the lower surface of the power receiving portion 116.

Thereby, the thick plate 41 and the thin plates 42, 43 forming the regulating portion 40 in the above described embodiment becomes unnecessary. Likewise, the attachment portion 117 to which the power receiving portion 116 is attached in the above described embodiment may be unnecessary.

If the power receiving portion 116 is used as the regulating portion 40, it is preferable that a buffer member for absorbing the impacts between the power receiving portion 116 and a contact portion 33 be added to the part of the power receiving portion 116 functioning as the edge 401 of the regulating portion 40.

While certain embodiments have been described, these embodiments are presented as examples, but not intended to limit the scope of the invention. These novel embodiments may be implemented in other various forms and various omissions, replacements, changes may be made without departing from the scope of the invention. These embodiments or their modifications are within the scope of the invention and within the scope of the invention described in claims and equivalents thereof.

What is claimed is:

1. A cart, comprising:
   a base unit with a wheel position at each of four corners and including a first frame portion and a second frame portion, the first frame portion connecting a pair of wheel positions on a first side, the second frame portion connecting a pair of wheel positions on a second side opposite the first side, the first and second frame portions coupled to each other by a frontend part;
   a basket unit above the base unit;
   a handle unit connecting the first frame portion to the second frame portion at a backside of the base unit and connecting the base unit to the basket unit;
   an inner frame portion between the first and second frame portions and extending to the frontend part of the base unit, the inner frame portion including a front contact portion and a stopper portion at a position closer to the backside of the base unit than the front contact portion;
   a spacer portion attached to the inner frame portion at a position closer to the backside of the base unit than the stopper portion, a back end of the spacer portion being positioned to contact a front contact portion of another cart when carts are nested together front-to-back; and
   a coupling portion on the spacer portion and extending towards the backside of the base unit, the coupling portion being positioned to be between the inner frame portion and a frontend part of another cart when carts are nested together front-to-back.

2. The cart according to claim 1, wherein the spacer portion is detachable from the inner frame portion.

3. The cart according to claim 1, wherein the coupling portion is integrally formed with the spacer portion.

4. The cart according to claim 1, wherein the coupling portion is attached to the spacer portion with screws.

5. The cart according to claim 1, wherein the coupling portion is a thin plate member.

6. The cart according to claim 1, wherein the spacer portion comprises an upper thin plate, a thick plate, and a lower thin plate.

7. The cart according to claim 1, wherein the coupling portion is attached to the lower thin plate.

8. The cart according to claim 1, further comprising:
a support pole attached to the handle unit; and
an electronic apparatus attached to the support pole.

9. The cart according to claim 8, further comprising:
a battery housing, wherein
the electronic apparatus is electrically connected to a battery inside the battery housing.

10. The cart according to claim 9, further comprising:
a contactless power receiving unit attached to the base unit, wherein
the contactless power receiving unit is electrically connected to the battery.

11. The cart according to claim 10, wherein the contactless power receiving unit is integrated with the spacer portion.

12. The cart according to claim 8, wherein the electronic apparatus is a merchandise registration device.

13. The cart according to claim 1, wherein the basket unit comprises a fixture permitting a hand-carriable basket to be attached.

14. A shopping cart for retail stores, the shopping cart comprising:
a base unit with a wheel position at each of four corners and including a first frame portion and a second frame portion, the first frame portion connecting a pair of wheel positions on a first side, the second frame portion connecting a pair of wheel positions on a second side opposite the first side, the first and second frame portions coupled to each other by a frontend part;
a basket unit above the base unit;
a handle unit connecting the first frame portion to the second frame portion at a backside of the base unit and connecting the base unit to the basket unit;
an inner frame portion between the first and second frame portions and extending to the frontend part of the base unit, the inner frame portion including a front contact portion and a stopper portion at a position closer to the backside of the base unit than the front contact portion;
a spacer portion attached to the inner frame portion at a position closer to the backside of the base unit than the stopper portion, a back end of the spacer portion being positioned to contact a front contact portion of another cart when carts are nested together front-to-back;
a coupling portion on the spacer portion and extending towards the backside of the base unit, the coupling portion being positioned to be between the inner frame portion and a frontend part of another cart when carts are nested together front-to-back;
a support pole attached to the handle unit;
an electronic apparatus attached to the support pole;
a battery housing; and
a contactless power receiving unit attached to the base unit, wherein
the electronic apparatus is electrically connected to a battery inside the battery housing, and
the contactless power receiving unit is electrically connected to the battery.

15. The shopping cart according to claim 14, wherein the spacer portion is detachable from the inner frame portion.

16. The shopping cart according to claim 14, wherein
the spacer portion comprises an upper thin plate, a thick plate, and a lower thin plate, and
the coupling portion is attached to the lower thin plate.

17. The shopping cart according to claim 14, wherein the electronic apparatus is a merchandise registration device.

18. The shopping cart according to claim 14, wherein the contactless power receiving unit is integrated with the spacer portion.

* * * * *